(12) United States Patent
Kim

(10) Patent No.: US 9,330,187 B2
(45) Date of Patent: May 3, 2016

(54) PERSUASIVE PORTLETS

(75) Inventor: Steven Paul Kim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3164 days.

(21) Appl. No.: 10/873,549

(22) Filed: Jun. 22, 2004

(65) Prior Publication Data

US 2005/0283524 A1 Dec. 22, 2005

(51) Int. Cl.
*G06F 15/16* (2006.01)
*G06F 17/30* (2006.01)
*H04L 29/08* (2006.01)

(52) U.S. Cl.
CPC .......... *G06F 17/30873* (2013.01); *H04L 67/02* (2013.01); *H04L 67/306* (2013.01); *H04L 67/36* (2013.01)

(58) Field of Classification Search
CPC . G06F 17/30873; H04L 67/02; H04L 67/306; H04L 67/36
USPC ........................................................ 715/765
See application file for complete search history.

(56) References Cited

U.S. PATENT DOCUMENTS

| | | | | |
|---|---|---|---|---|
| 5,796,402 A * | 8/1998 | Ellison-Taylor | ......... | G09G 5/14 715/792 |
| 6,043,817 A * | 3/2000 | Bolnick et al. | ................ | 715/788 |
| 6,373,506 B1 * | 4/2002 | Hosomi | .......... | 715/806 |
| 7,062,511 B1 * | 6/2006 | Poulsen | ............ | G06F 17/30873 |
| 7,072,934 B2 * | 7/2006 | Helgeson | ................ | G06F 9/468 709/203 |
| 7,660,899 B2 * | 2/2010 | Gavrilescu | ........ | G06F 17/30873 709/204 |
| 7,694,000 B2 * | 4/2010 | Flores | .................. | G06Q 30/02 709/217 |
| 7,761,878 B2 * | 7/2010 | Wei | ...................... | G06F 17/2247 709/203 |
| 7,996,770 B2 * | 8/2011 | Chakravarthy | ................ | 715/273 |
| 8,056,014 B2 * | 11/2011 | Brockway et al. | ............ | 715/788 |
| 2001/0009016 A1 * | 7/2001 | Hofmann | ................ | G06F 9/541 709/219 |
| 2001/0023414 A1 * | 9/2001 | Kumar et al. | .................. | 705/35 |
| 2001/0034771 A1 * | 10/2001 | Hutsch | .................... | G06F 9/541 709/217 |
| 2002/0165721 A1 * | 11/2002 | Chang | .................... | G10L 19/00 704/503 |
| 2002/0169852 A1 * | 11/2002 | Schaeck | ............... | G06Q 20/108 709/218 |
| 2002/0196287 A1 * | 12/2002 | Taylor | .................. | G06F 3/0481 715/792 |
| 2003/0040921 A1 * | 2/2003 | Hughes | .................. | G06Q 30/02 705/14.66 |
| 2003/0055624 A1 | 3/2003 | Fletcher et al. | | |
| 2003/0065706 A1 * | 4/2003 | Smyth | ............... | G06F 17/30867 709/200 |
| 2003/0117437 A1 * | 6/2003 | Cook | ................. | G06F 17/30581 715/764 |
| 2003/0121983 A1 * | 7/2003 | Herle | ................. | G06F 17/30905 235/472.01 |
| 2003/0137538 A1 * | 7/2003 | Hesmer | ............... | G06F 17/2276 715/760 |
| 2003/0149722 A1 | 8/2003 | Jolley et al. | | |
| 2003/0167315 A1 | 9/2003 | Chowdhry et al. | | |
| 2003/0233425 A1 | 12/2003 | Lyons | | |
| 2004/0001565 A1 | 1/2004 | Jones et al. | | |

FOREIGN PATENT DOCUMENTS

CA 2406569 4/2004

*Primary Examiner* — Jung-Mu Chuang
(74) *Attorney, Agent, or Firm* — Steven M. Greenberg, Esq.; CRGO LAW

(57) ABSTRACT

A new or existing portlet queries the category attribute of other portlets on a portal page. The new or existing portlet may take a position adjacent to other portlets having the same category attribute. The new or existing portlet may adjust its size or one or more of the other portlets may adjust their size so that the portlets are aligned with one another.

60 Claims, 6 Drawing Sheets

(56) References Cited

U.S. PATENT DOCUMENTS

| | | | |
|---|---|---|---|
| 2004/0003096 A1 | 1/2004 | Willis | |
| 2004/0030795 A1 | 2/2004 | Hesmer et al. | |
| 2004/0054749 A1 | 3/2004 | Doyle | |
| 2004/0068554 A1 | 4/2004 | Bales et al. | |
| 2004/0068568 A1* | 4/2004 | Griffin | G06F 3/0481 709/227 |
| 2004/0098467 A1* | 5/2004 | Dewey | G06F 17/30873 709/219 |
| 2004/0205555 A1* | 10/2004 | Hind | G06F 17/30873 715/205 |
| 2004/0212640 A1* | 10/2004 | Mann et al. | 345/792 |
| 2005/0010634 A1* | 1/2005 | Henderson et al. | 709/201 |
| 2005/0021765 A1* | 1/2005 | Flores | G06Q 30/02 709/228 |
| 2005/0065913 A1* | 3/2005 | Lillie et al. | 707/3 |
| 2005/0198201 A1* | 9/2005 | Bohn et al. | 709/218 |
| 2007/0124701 A1* | 5/2007 | Gong | G06F 17/30873 715/854 |
| 2008/0282162 A1* | 11/2008 | Lincke | G06F 17/3089 715/710 |

* cited by examiner

PERSUASIVE PORTLETS

BACKGROUND OF THE INVENTION

The present invention relates generally to web portals, and more specifically, to portlets that change size and position based on the surrounding portlets.

Web portals provide a means of delivering aggregated, personalized content to computer users. Typically, a portal server includes a portal program (e.g., WebSphere® Portal Server from International Business Machines Corp. (IBM) of Armonk, N. Y.—WebSphere® is a registered trademark of IBM), which obtains and aggregates portal content into a portal page. The portal page includes sections or visual portlets that each contain particular portal content formatted according to a user's preferences. A portal is a type of content framework which is designed to serve as a gateway, or focal point, for end users to access an aggregation or collection of information and applications from many different sources. For example, a user could establish his/her own portal page that has sections for news, weather and sports. When the page is requested, the portal program would obtain the portlets from the appropriate content providers.

A portal page is often structured in row and column format. The obtained portlets may be added to the portal page either statically or dynamically. In a static portal page, the administrator of the page determines the size and position of the portal based on its content or other parameters. For example, a particular portal page may only allow box scores and weather to be added to the left hand column while news may only be added to the right hand column. The end-user may be able to manually change the location of the specific portlet within each column (i.e., box scores followed by weather) but the user cannot change the size of the portlet or align items in each column together. In a dynamic portal page, the size and location of the portlet is based on the design constraints of the portal page itself. For example, the size of the portlet is based on the predetermined dimensions of the row and/or column. The end-user may again change the location of the portlet but may not change the size of the portlet or its alignment relative to other portlets.

BRIEF SUMMARY OF THE INVENTION

According to one aspect of the present invention, a portlet is manipulated on a portal page by comparing a category attribute of the portlet with another portlet. The portlet is then located adjacent to the other portlet on the portal page if the category attribute of the portlet is the same as the category attribute of the other portlet. Further, the size of the portlet or the other portlet may be adjusted so that the portlets are aligned with each other.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
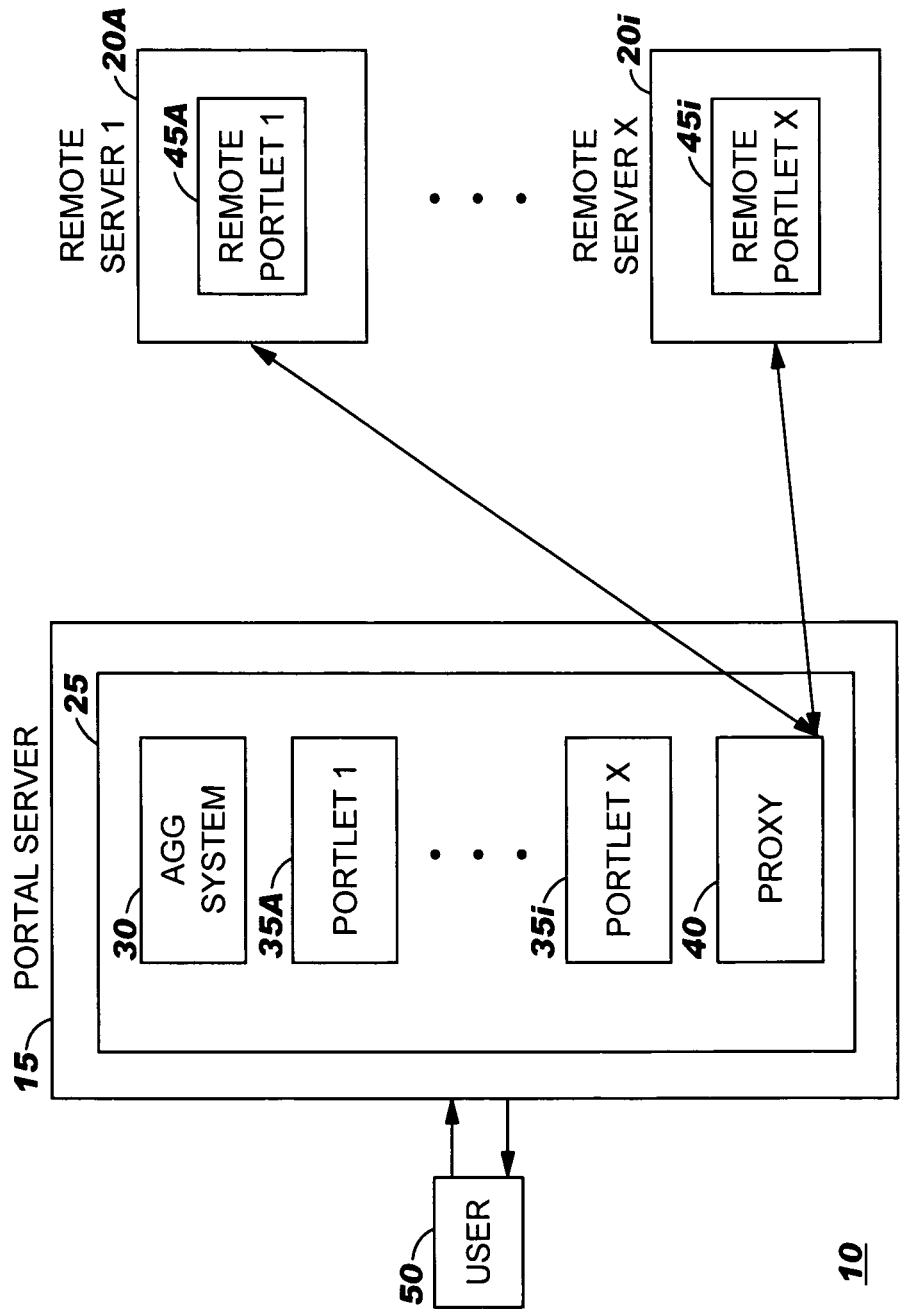
FIG. 1 illustrates a system for handling portlets.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a system 10 for portlet handling is shown. The system 10 includes a portal server 15 and a plurality of remote servers 20A-20i. The portal server 15 includes a portal program 25 (e.g., IBM's WebSphere® Portal Server), which itself may include, among other things, an aggregation system 30, a plurality of portlets 35A-35i and a proxy 40. The proxy 40 communicates with the remote servers 20A-20i to retrieve appropriate remote portlets 45A-45i. A user 50 communicates with the portal server 15 to request and receive portal content. When the user 50 makes a request for portal content, the portal program 25 will receive the request and invoke the appropriate portlets 35A-35i and the proxy 40 to retrieve the requested content. Specifically, the portlets 35A-35i will generate particular types of portal content while the proxy 40 causes the appropriate remote portlets 45A-45i to generate other portal content. The content generated by the appropriate remote portlets 45A-45i will then be transmitted to the portal server 15. Once all of the requested portal content has been obtained, it will be aggregated via the aggregation system 30 and displayed to the user 50 as a portal page (not shown). It will be appreciated to those skilled in the art that the portal page may be displayed on any appropriate device using any appropriate display application. In this manner, the user utilizes a thin client to receive portal content. However, it will be appreciated to those skilled in the art that the present invention is not in any way to limited to a thin client as the user may utilize any appropriate application to receive portal content.

Figure 2:
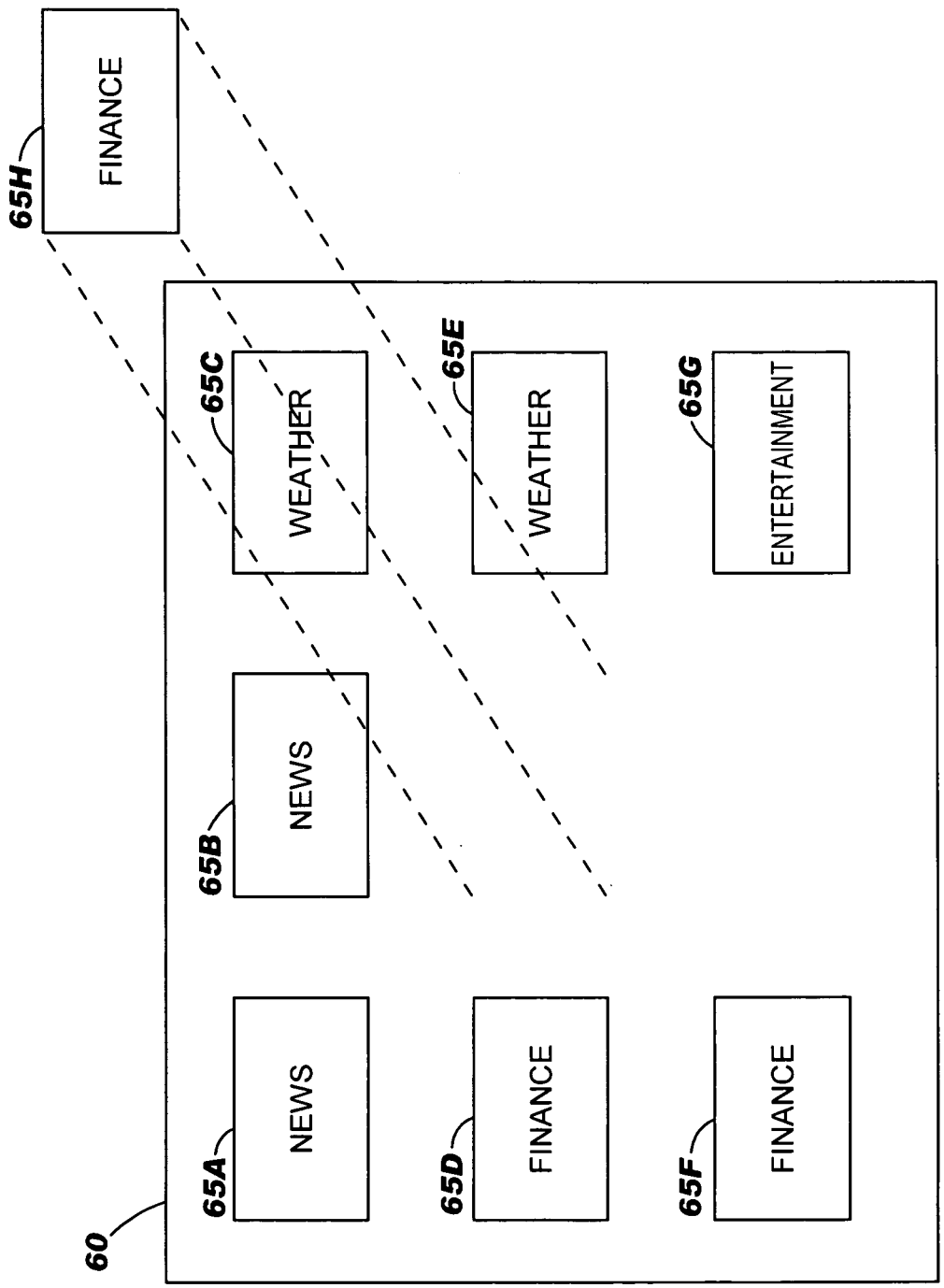
FIG. 2 illustrates a portal page according to one aspect of the present invention.

Referring now to FIG. 2, a portal page 60 according to the present invention is shown. The portlet page 60 includes a plurality of portlets 65A-65G arranged in three (3) rows and three (3) columns. It will be appreciated by those skilled in the art that the disclosed arrangement is for illustrative purposes only and that the portal page may have any appropriate arrangement. In addition, the portlets 65A-65G may include remote portlets, portal server portals or any combination thereof. Each of the portlets 65A-65G include a category attribute identifying the content of the portlet. In the illustrative example, portlets 65A, B are news portlets, portlets 65C, E are weather portlets, portlets 65D, F are finance portlets and portlet G is an entertainment portlet. It will be appreciated by those skilled in the art that any combination and types of portlets may be used.

A new portlet 65H may be added to the portal page 60. In the illustrative example, portlet 65H is a finance portlet. As portlet 65 H is a new portlet, it may initially be added to a default position between portlets 65D, E. It will be appreciated by those skilled in the art that the initial position may be any position on the portal page 60 and the default position may be any position on the page as determined by the user, the designer of the portal page or the administrator of the portal page. The new portlet 65H queries all of the surrounding portlets 65A-G to determine if any of the portlets have a category attribute that matches its category attribute. In the illustrated example, portlets 65D, F have the same category attribute. New portlet 65H may take a position in the same column or in the same rows as portlets 65D, F. A new portlet will first attempt to take a position in the same row as a portlet having the same category attribute. If a position in a row is not available then the portlet will attempt to take a position adjacent to and in the same column as a portlet having the same category attribute. In the illustrated embodiment, the portlet 65H will take a position adjacent to and on the same row as portlet 65D.

Figure 3:
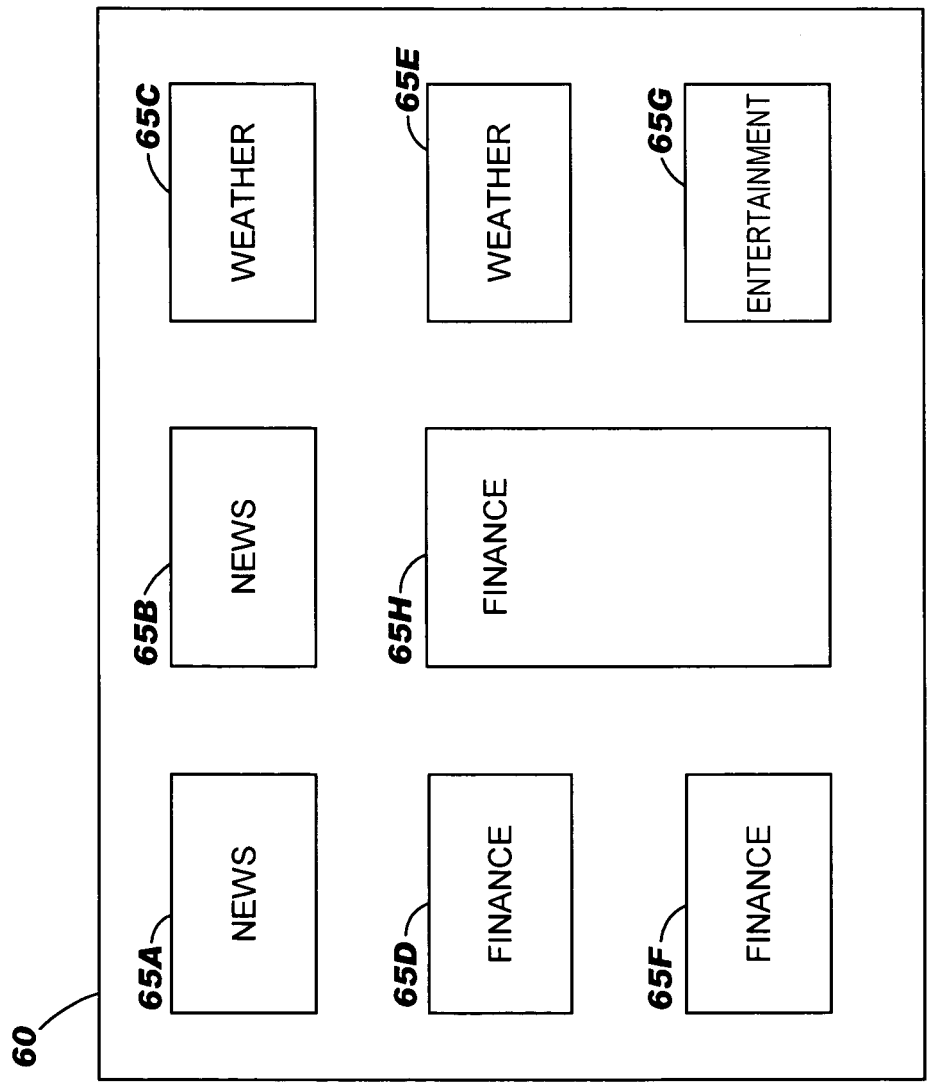
FIG. 3 illustrates a portal page according to another aspect of the present invention.

Now that a potential position of the new portlet 65H has been determined, the new portlet 65H will determine whether to adjust its size or content to align with the other portlets. The new portlet may adjust its size so that it is aligned with those surrounding portlets having the same category attribute as itself or with the surrounding portlets in general so all of the portlets are aligned with one another. It will be appreciated by those skilled in the art that a portlet may adjust its size by any known method such as adjusting the character count of the portlet or adding or removing scroll bars so that all of the contents of the portlet may be viewed. As shown in FIG. 3, portlet 65H may adjust its size so that it is aligned with both finance portlets 65D, F. The new portlet 65H is positioned adjacent to portlets 65D, F as it expanded its size to align itself with those portlets have the same category attribute. The top of the portlet 65H is aligned with the top of portlet 65D while the bottom of portlet 65H is aligned with the bottom of portlet 64F.

Figure 4:
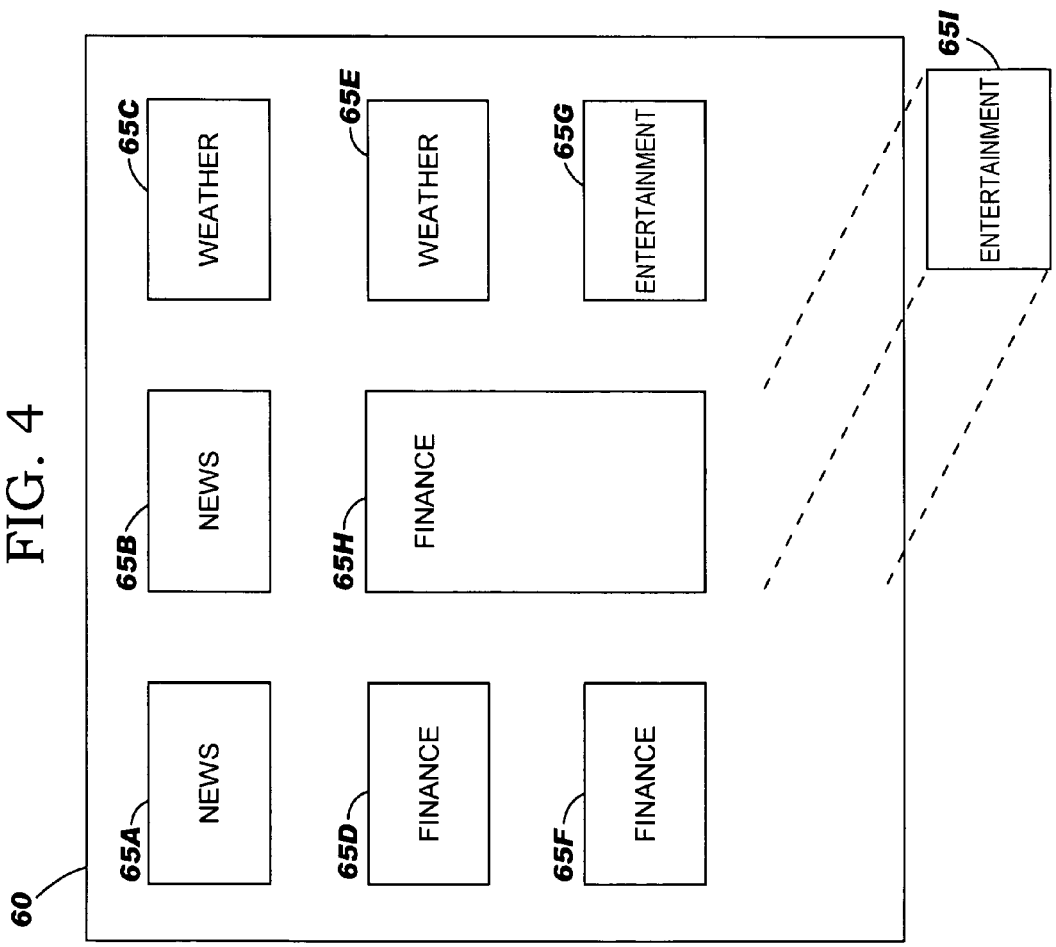
FIG. 4 illustrates a portal page according to further aspect of the present invention.
Figure 5:
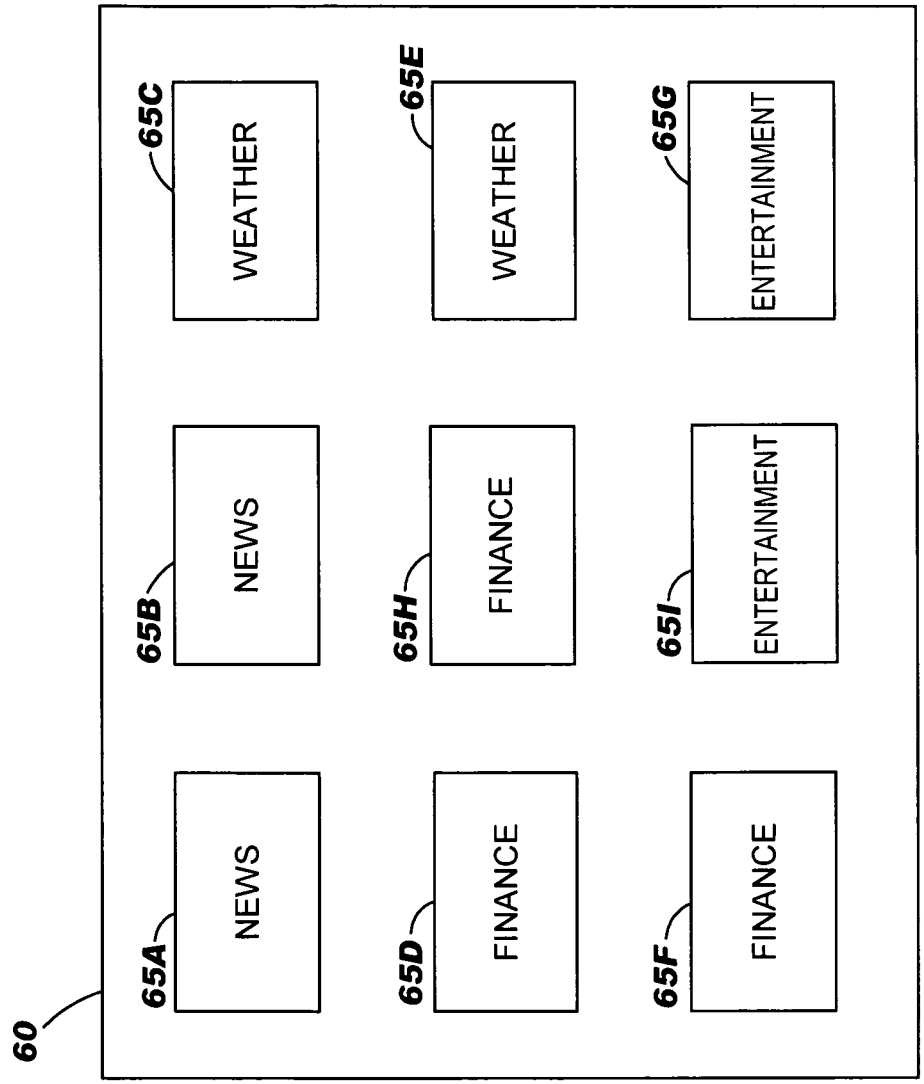
FIG. 5 illustrates a portal page according to a still further aspect of the present invention.

Referring now to FIG. 4, another new portlet 65I may be added to the portal page 60. In the illustrated example, portlet 65I is an entertainment portlet and has an initial default position below the portlet 65H. Portlet 65I queries all of the surrounding portlets 65F-H to determine if any of the portlets have a category attribute that matches its category attribute. As portlet 65G is also an entertainment portlet, one of the desired positions for portlet 65I is adjacent to and in the same row as portlet 65G. Portlet 65H currently occupies the position adjacent to and in the same row as portlet 65G so portlet 65I will attempt to persuade portlet 65H to adjust its position so that portlet 65I may occupy the space adjacent to and on the same row as portlet 65G. Referring now to FIG. 5, portlet 65H adjusts its size so that portlet 65I may occupy the position adjacent to and in the same row as portlet 65G. If portlet 65H is unable to adjust its size, portlet 65I may take a position adjacent to and in the same column as portlet 65G.

It will be apparent to those skilled in the art that the above description applies equally to a new portlet added to a portal page as well as an existing portlet moved from an existing location on the portal page. In addition, the portlets will communicate with each other so that portlets with the same category attribute are positioned adjacent to one another and on the same row. If there are any conflicts, the portlet belonging in the group with the greatest number of portlets will take precedent over another portlet belonging to a smaller group. A new portlet will take the initial default position if none of the surrounding portlets have the same category attribute. It will be appreciated by those skilled in the art that a portlet may query the surrounding portlets on the portal page, all of the portlets on the portal page or any appropriate or desired subset thereof. The feature of changing the position or adjusting the size of the portlet may be set by the end user or any appropriate entity to lock a portlet in place so that its position and/or size remains fixed.

Figure 6:
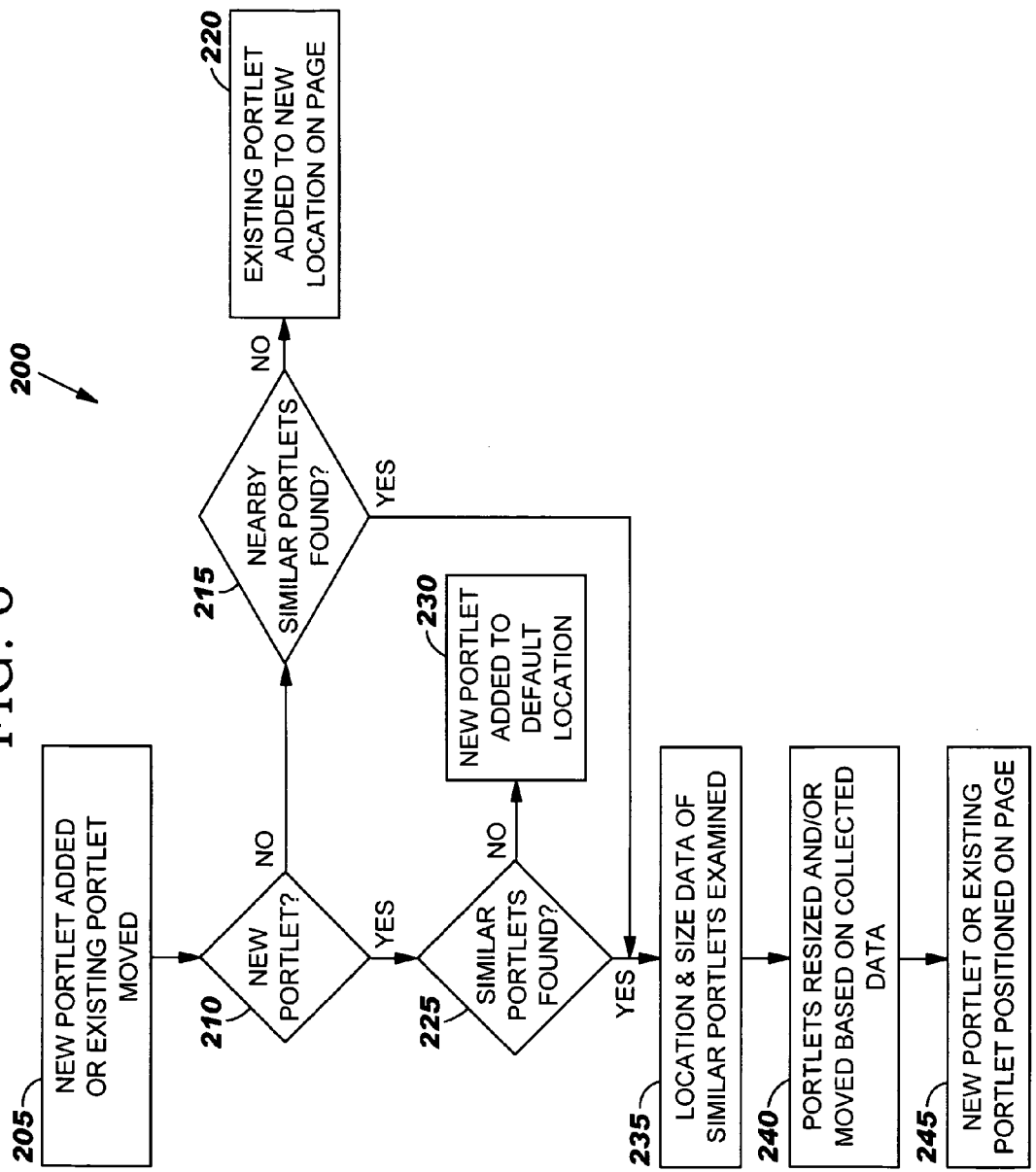
FIG. 6 illustrates a flowchart according to one aspect of the present invention.

Referring now to FIG. 6, a flowchart 200 illustrating possible logic for implementing the present invention is shown. In block 205, a new portlet is added to a portal page or an existing portlet is moved from a first location to a second location. Block 210 determines whether a new portlet has been added. If a new portlet has not been added then the existing portlet that has moved to a new location is evaluated. Block 215 determines if the category attributes of the nearby portlets are similar to the moved portlet. If the categories attributes are not the same then the existing portlet is added to the new location without any other changes in block 220.

Block 225 determines if the category attributes of the other portlets, either nearby portlets or all of the portlets as appropriate, are similar to the new portlet. If the categories attributes are not the same then the new portlet is added to the default location without any other changes in block 230.

If similar portlets are found in blocks 215 or 225, location and size data of the similar portlets is examined in block 235. In block 240, the portlets on the portal page and/or the new or moved portlets are moved and/or resized based on the collected data. As stated above, the portlets are moved or resized so that portlets having similar category attributes are grouped together adjacent to one another. In addition, the size of the portlets are adjusted so that the portlets are aligned with one another. In block 245, the new portlet or the existing portlet are positioned on the portal page.

The flowchart and block diagrams of FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It is apparent to one skilled in the art that numerous modifications and departures from the specific embodiments described herein may be made without departing from the spirit and scope of the invention.

What is claimed is:

1. A method of manipulating a portlet on a portal page, the method comprising:
   comparing a category attribute of a first portlet and at least one other portlet on the portal page;
   communicating with the at least one other portlet a request to adjust a size of the at least one other portlet to as to permit a positioning of the first portlet adjacent to the at least one other portlet on the portal page;
   responsive to an adjustment of the size of the at least one other portlet, positioning the first portlet adjacent to the at least one other portlet on the portal page but not aligned with the at least one other portlet on the portal page, computing a size for the first portlet so as to substantially align the first portlet with the at least one other portlet on the portal page and adjusting the size of the first portlet based upon the computation, without separately aligning the first portlet with each of the at least one other portlet, such that the first portlet is substantially aligned with the at least one other portlet based upon the category attribute of the first portlet being the same as the category attribute of the at least one other portlet; and,
   responsive to determining a conflict between the first portlet and yet another portlet seeking to be positioned adjacent to the at least one other and different portlet on the portal page, the category attribute of the first portlet differing from a category attribute of the yet another portlet, resolving the conflict in favor of a portlet amongst the first portlet and the yet another portlet determined to belong to a grouping of a greatest number of portlets.

2. The method of claim 1, further comprising adjusting the size of the at least one other portlet.

3. The method of claim 2, wherein adjusting the size of the at least one other portlet comprises adjusting the size of the at least one other portlet such that the first portlet is substantially aligned with the at least one other portlet.

4. The method of claim 1, wherein the first portlet is a newly added portlet.

5. The method of claim 1, wherein the first portlet is an existing portlet moved from an existing position.

6. The method of claim 1, wherein positioning the first portlet adjacent to the at least one other portlet on the portal page upon the category attribute of the first portlet being the same as the category attribute of the at least one other portlet comprises positioning the first portlet adjacent to and on a row same as the at least one other portlet.

7. The method of claim 1, wherein positioning the first portlet adjacent to the at least one other portlet on the portal page upon the category attribute of the first portlet being the same as the category attribute of the at least one other portlet comprises positioning the first portlet adjacent to and in a column same as the at least one other portlet.

8. A method of displaying portlets on a portal page, the method comprising:
   comparing a category attribute of a first portlet with a category attribute of each of a plurality of other portlets on the portal page;
   communicating with at least one of the plurality of other portlets a request to adjust a size of the at least one of the plurality of other portlets to as to permit a positioning of the first portlet adjacent to the at least one of the plurality of other portlets on the portal page;
   responsive to an adjustment of the size of the at least one of the plurality of other portlets, rendering the first portlet such that the first portlet is substantially adjacent to the at least one of the plurality of other portlets having the same category attribute as the first portlet but not aligned with the at least one of the plurality of other portlets computing a size for the first portlet so as to substantially align the first portlet with the at least one of the plurality of other portlets on the portal page, and adjusting the size of the first portlet based upon the computation, without separately aligning the first portlet with each of the at least one of the plurality of other portlets, such that the first portlet is substantially aligned with the at least one of the plurality of other portlets having the same category attribute as the first portlet; and,
   responsive to determining a conflict between the first portlet and yet another portlet seeking to be positioned adjacent to the at least one of the plurality of other and different portlets on the portal page, the category attribute of the first portlet differing from a category attribute of the yet another portlet, resolving the conflict in favor of a portlet amongst the first portlet and the yet another portlet determined to belong to a grouping of a greatest number of portlets.

9. The method of claim 8, wherein adjusting the size of the first portlet comprises adjusting the size of the first portlet such that the first portlet is substantially aligned with those other portlets having the same category attribute as the first portlet.

10. The method of claim 8, further comprising adjusting the size of the at least one of the plurality of other portlets.

11. The method of claim 10, wherein adjusting the size of the at least one of the plurality of other portlets comprises adjusting the size of the at least one of the plurality of other portlets such that the first portlet is substantially aligned with the at least one of the plurality of other portlets having the same category attribute as the first portlet.

12. The method of claim 10, wherein adjusting the size of the at least one of the plurality of other portlets comprises adjusting the size of the at least one of the plurality of other portlets such that the first portlet is substantially aligned with those other portlets having the same category attribute as the first portlet.

13. The method of claim 8, wherein the first portlet is a newly added portlet having an initial default position on the portal page, and wherein comparing a category attribute of a first portlet with a category attribute of each of a plurality of other portlets comprises comparing the category attribute of the first portlet with the category attribute of each of those plurality of other portlets immediately surrounding the initial default position.

14. The method of claim 8, wherein the first portlet is an existing portlet moved from a first position to a second position on the portal page, and wherein comparing a category attribute of a first portlet with a category attribute of each of a plurality of other portlets comprises comparing the category attribute of the first portlet with the category attribute of each of those plurality of other portlets immediately surrounding the second position.

15. The method of claim 8, wherein rendering the first portlet such that it is substantially adjacent to the at least one of the plurality of other portlets having the same category attribute as the first portlet comprises rendering the first portlet such that it is substantially adjacent to and on a row same as the at least one of the plurality of other portlets having the same category attribute as the first portlet.

16. The method of claim 8, wherein rendering the first portlet such that it is substantially adjacent to the at least one of the plurality of other portlets having the same category attribute as the first portlet comprises rendering the first portlet such that it is substantially adjacent to and in a column same as the at least one of the plurality of other portlets having the same category attribute as the first portlet.

17. A method of handling portlets on a portal page, the method comprising:
querying a category attribute of a plurality of other portlets by a first portlet on the portal page;
communicating with at least one of the plurality of other portlets a request to adjust a size of the at least one of the plurality of other portlets to as to permit a positioning of the first portlet adjacent to the at least one of the plurality of other portlets on the portal page;
responsive to an adjustment of the size of the at least one of the plurality of other portlets, positioning the first portlet substantially adjacent to at least one of the plurality of other portlets having the same category attribute as the first portlet but not aligned with the at least one of the plurality of other portlets; the first portlet computing a size for the first portlet without separately aligning the first portlet with each of the at least one of the plurality of other portlet, so as to substantially align the first portlet with the at least one of the plurality of other portlets on the portal page and adjusting the size of the first portlet based upon the computation, such that the first portlet is substantially aligned with the at least one of the plurality of other portlets having the same category attribute as the first portlet; and,
responsive to determining a conflict between the first portlet and yet another portlet seeking to be positioned adjacent to the at least one of the plurality of other and different portlets on the portal page, the category attribute of the first portlet differing from a category attribute of the yet another portlet, resolving the conflict in favor of a portlet amongst the first portlet and the yet another portlet determined to belong to a grouping of a greatest number of portlets.

18. The method of claim 17, wherein the first portlet adjusting its size comprises the first portlet adjusting its size such that the first portlet is substantially aligned with those other portlets having the same category attribute as the first portlet.

19. The method of claim 17, further comprising the first portlet causing the at least one of the plurality of other portlets to adjust its size.

20. The method of claim 19, wherein the first portlet causing the at least one of the plurality of other portlets to adjust its size comprises the first portlet causing the at least one of the plurality of other portlets to adjust its size such that the first portlet is substantially aligned with the at least one of the plurality of other portlets having the same category attribute as the first portlet.

21. The method of claim 19, wherein the first portlet causing the at least one of the plurality of other portlets to adjust its size comprises the first portlet causing the at least one of the plurality of other portlets to adjust its size such that the first portlet is substantially aligned with those other portlets having the same category attribute as the first portlet.

22. The method of claim 17, wherein the first portlet is a newly added portlet having an initial default position on the portal page, and wherein querying a category attribute of a plurality of other portlets by a first portlet comprises querying the category attribute of the plurality of other portlets immediately surrounding the initial default position of the first portlet.

23. The method of claim 17, wherein the first portlet is an existing portlet moved from a first position to a second position on the portal page, and wherein querying a category attribute of a plurality of other portlets by a first portlet comprises querying the category attribute of the plurality of other portlets immediately surrounding the second position of the first portlet.

24. A computer program product for manipulating a portlet on a portal page, the computer program product comprising:
a computer readable storage medium comprising a memory device having computer readable program code embodied therein, the computer readable program code performing steps comprising:
comparing a category attribute of a first portlet and at least one other portlet on the portal page;
communicating with the at least one other portlet a request to adjust a size of the at least one other portlet to as to permit a positioning of the first portlet adjacent to the at least one other portlet on the portal page;
responding to an adjustment of the size of the at least one other portlet, by positioning the first portlet adjacent to the at least one other portlet on the portal page but not aligned with the at least one other portlet on the portal page, by computing a size for the first portlet without separately aligning the first portlet with each of the at least one other portlet, so as to substantially align the first portlet with the at least one other portlets on the portal page and by adjusting the size of the first portlet such that the first portlet is substantially aligned with the at least one other portlet upon the category attribute of the first portlet being the same as the category attribute of the at least one other portlet; and, responding to determining a conflict between the first portlet and yet another portlet seeking to be positioned adjacent to the at least one other and different portlet on the portal page, the category attribute of the first portlet differing from a category attribute of the yet another portlet, by resolving the conflict in favor of a portlet amongst the first portlet and the yet another portlet determined to belong to a grouping of a greatest number of portlets.

25. The computer program product of claim 24, wherein the computer readable program code further performs the step of adjusting the size of the at least one other portlet.

26. The computer program product of claim 25, wherein the adjusting of the size of the at least one other portlet comprises adjusting the size of the at least one other portlet such that the first portlet is substantially aligned with the at least one other portlet.

27. The computer program product of claim 24, wherein the first portlet is a newly added portlet having an initial default position on the portal page.

28. The computer program product of claim 24, wherein the first portlet is an existing portlet moved from a first position to a second position on the portal page.

29. The computer program product of claim 24, wherein the positioning comprises positioning the first portlet adjacent to and on a row same as the at least one other portlet.

30. The computer program product of claim 24, wherein the positioning comprises positioning the first portlet adjacent to and in a column same as the at least one other portlet.

31. A computer program product for displaying portlets on a portal page, the computer program product comprising:

a computer readable storage medium comprising a memory device having computer readable program code embodied therein, the computer readable program code performing steps comprising:

comparing a category attribute of a first portlet with a category attribute of each of a plurality of other portlets on the portal page;

communicating with at least one of the plurality of other portlets a request to adjust a size of the at least one of the plurality of other portlets to as to permit a positioning of the first portlet adjacent to the at least one of the plurality of other portlets on the portal page;

responding to an adjustment of the size of the at least one of the plurality of other portlets, by computing a size for the first portlet so as to substantially align the first portlet with the at least one of the plurality of the other portlets on the portal page, to render the first portlet according to the computed size prior to displaying the first portlet such that the first portlet once displayed is substantially adjacent to the at least one of the plurality of other portlets having the same category attribute as the first portlet but not aligned with the at least one of the plurality of other portlets, and to adjust the size of the first portlet without separately aligning the first portlet with each of the at least one of the plurality of other portlets, such that the first portlet is substantially aligned with the at least one of the plurality of other portlets having the same category attribute as the first portlet; and, responding to determining a conflict between the first portlet and yet another portlet seeking to be positioned adjacent to the at least one of the plurality of other and different portlets on the portal page, the category attribute of the first portlet differing from a category attribute of the yet another portlet, by resolving the conflict in favor of a portlet amongst the first portlet and the yet another portlet determined to belong to a grouping of a greatest number of portlets.

32. The computer program product of claim 31, wherein the adjusting of the size of the first portlet comprises adjusting the size of the first portlet such that the first portlet is substantially aligned with those other portlets having the same category attribute as the first portlet.

33. The computer program product of claim 31, wherein the computer readable program code further adjusts the size of the at least one of the plurality of other portlets.

34. The computer program product of claim 33, wherein the adjusting of the size of the at least one of the plurality of other portlets comprises adjusting the size of the at least one of the plurality of other portlets such that the first portlet is substantially aligned with the at least one of the plurality of other portlets having the same category attribute as the first portlet.

35. The computer program product of claim 33, wherein the adjusting of the size of the at least one of the plurality of other portlets comprises adjusting the size of the at least one of the plurality of other portlets such that the first portlet is substantially aligned with those other portlets having the same category attribute as the first portlet.

36. The computer program product of claim 31, wherein the first portlet is a newly added portlet having an initial default position on the portal page, and wherein the comparing of a category attribute of a first portlet with a category attribute of each of a plurality of other portlets comprises comparing the category attribute of the first portlet with the category attribute of each of the plurality of other portlets immediately surrounding the initial default position.

37. The computer program product of claim 31, wherein the first portlet is an existing portlet moved from a first position to a second position on the portal page, and wherein the comparing of a category attribute of a first portlet with a category attribute of each of a plurality of other portlets comprises comparing the category attribute of the first portlet with the category attribute of each of the plurality of other portlets immediately surrounding the second position.

38. The computer program product of claim 31, wherein the rendering of the first portlet such that it is substantially adjacent to the at least one of the plurality of other portlets having the same category attribute as the first portlet comprises rendering the first portlet such that it is substantially adjacent to and on a row same as the at least one of the plurality of other portlets having the same category attribute as the first portlet.

39. The computer program product of claim 31, wherein the rendering of the first portlet such that it is substantially adjacent to the at least one of the plurality of other portlets having the same category attribute as the first portlet comprises rendering the first portlet such that it is substantially adjacent to and in a column same as the at least one of the plurality of other portlets having the same category attribute as the first portlet.

40. A computer program product for handling portlets on a portal page, the computer program product comprising:

a computer readable storage medium comprising a memory device having computer readable program code embodied therein, the computer readable program code performing steps comprising:

querying a category attribute of a plurality of other portlets by a first portlet on the portal page;

communicating with at least one of the plurality of other portlets a request to adjust a size of the at least one of the plurality of other portlets to as to permit a positioning of the first portlet adjacent to the at least one of the plurality of other portlets on the portal page;

responding to an adjustment of the size of the at least one of the plurality of other portlets, by positioning the first portlet substantially adjacent to the at least one of the plurality of other portlets having the same category attribute as the first portlet but not aligned with the at least one of the plurality of other portlets, and computing a size for the first portlet so as to substantially align the first portlet with the at least one of the plurality of other portlets on the portal page, to adjust the size of the first portlet according to the computed size without separately aligning the first portlet with each of the at least one of the plurality of other portlets, such that the first portlet is substantially aligned with the at least one of the plurality of other portlets having the same category attribute as the first portlet; and, responding to determining a conflict between the first portlet and yet another portlet seeking to be positioned adjacent to the at least one of the plurality of other and different portlets on the portal page, the category attribute of the first portlet differing from a category attribute of the yet another portlet, by resolving the conflict in favor of a portlet amongst the first portlet and the yet another portlet determined to belong to a grouping of a greatest number of portlets.

41. The computer program product of claim 40, wherein the first portlet adjusts its size such that the first portlet is substantially aligned with those other portlets having the same category attribute as the first portlet.

42. The computer program product of claim 40, wherein the first portlet causes the at least one of the plurality of other portlets to adjust its size.

43. The computer program product of claim 42, wherein the first portlet causes the at least one of the plurality of other portlets to adjust its size such that the first portlet is substantially aligned with the at least one of the plurality of other portlets having the same category attribute as the first portlet.

44. The computer program product of claim 42, wherein the first portlet causes the at least one of the plurality of other portlets to adjust its size such that the first portlet is substantially aligned with those other portlets having the same category attribute as the first portlet.

45. The computer program product of claim 40, wherein the first portlet is a newly added portlet having an initial default position on the portal page, and wherein the querying of a category attribute of a plurality of other portlets by a first portlet comprises querying the category attribute of the plurality of other portlets immediately surrounding the initial default position of the first portlet.

46. The computer program product of claim 40, wherein the first portlet is an existing portlet moved from a first position to a second position on the portal page, and wherein the querying of a category attribute of a plurality of other portlets by a first portlet querying the category attribute of the plurality of other portlets immediately surrounding the second position of the first portlet.

47. A computer system having a computer display for displaying a first portlet having a category attribute representative of content of the first portlet, the portlet comprising program logic that performs upon execution steps of:

querying a category attribute of a plurality of other portlets on a portal page;

communicating with at least one of the plurality of other portlets a request to adjust a size of the at least one of the plurality of other portlets to as to permit a positioning of the first portlet adjacent to the at least one of the plurality of other portlets on the portal page;

responding to an adjustment of the size of the at least one of the plurality of other portlets, by positioning the first portlet on the portal page substantially adjacent to at least one of the plurality of other portlets having the same category attribute but not aligned with the at least one of the plurality of other portlets computing a size for the first portlet so as to substantially align the first portlet with the at least one of the plurality of other portlets on the portal page and adjusting the size of the first portlet according to the computed size, without separately aligning the first portlet with the at least one of the plurality of other portlets, such that the first portlet is substantially aligned with the at least one of the plurality of other portlets having the same category attribute as the first portlet; and, responding to determining a conflict between the first portlet and yet another portlet seeking to be positioned adjacent to the at least one of the plurality of other and different portlets on the portal page, the category attribute of the first portlet differing from a category attribute of the yet another portlet, by resolving the conflict in favor of a portlet amongst the first portlet and the yet another portlet determined to belong to a grouping of a greatest number of portlets.

48. The computer system of claim 47, wherein the adjusting comprises enabling the first portlet to adjust its size such that the first portlet is substantially aligned with those other portlets having the same category attribute as the first portlet.

49. The computer system of claim 47, wherein the steps further include enabling the first portlet to cause the at least one of the plurality of other portlets to adjust its size.

50. The computer system of claim 49, wherein the enabling the first portlet to cause the at least one of the plurality of other portlets to adjust its size comprises enabling the first portlet to cause the at least one of the plurality of other portlets to adjust its size such that the first portlet is substantially aligned with the at least one of the plurality of other portlets having the same category attribute as the portlet.

51. The computer system of claim 49, wherein the enabling the first portlet to cause the at least one of the plurality of other portlets to adjust its size comprises enabling the first portlet to cause the at least one of the plurality of other portlets to adjust its size such that the first portlet is substantially aligned with those other portlets having the same category attribute as the first portlet.

52. The computer system of claim 47, wherein the first portlet is a newly added portlet having an initial default position on the portal page, and wherein the querying comprises querying the category attribute of the plurality of other portlets immediately surrounding the initial default position of the first portlet.

53. The computer system of claim 47, wherein the first portlet is an existing portlet moved from a first position to a second position on the portal page, and wherein the querying a category attribute of a plurality of other portlets on a portal page comprises querying the category attribute of the plurality of other portlets immediately surrounding the second position of the first portlet.

54. A computer system having a computer display for displaying a portal page, comprising:
   a plurality of portlets associated with the portal page, each of the plurality of portlets having a category attribute representative of the content of the portlet;
   wherein a first portlet of the plurality of portlets:
      queries the category attribute of each of the plurality of other portlets on the portal page,
      communicates with at least one of the plurality of other portlets a request to adjust a size of the at least one of the plurality of other portlets to as to permit a positioning of the first portlet adjacent to the at least one of the plurality of other portlets on the portal page;
      responds to an adjustment of the size of the at least one of the plurality of other portlets, by taking a position for the first portlet on the portal page substantially adjacent to the at least one of the plurality of other portlets having the same category attribute but not aligned with the at least one of the plurality of other portlets, computing a size for the first portlet so as to substantially align the first portlet with each of the at least one of the plurality of other portlets on the portal page and adjusting the size of the first portlet according to the computed size without separately aligning the first portlet with each of the at least one of the plurality of other portlets, such that the first portlet is substantially aligned with the at least one of the plurality of other portlets having the same category attribute as the first portlet; and,
      responds to determining a conflict between the first portlet and yet another portlet seeking to be positioned adjacent to the at least one of the plurality of other and different portlets on the portal page, the category attribute of the first portlet differing from a category attribute of the yet another portlet, by resolving the conflict in favor of a portlet amongst the first portlet and the yet another portlet determined to belong to a grouping of a greatest number of portlets.

55. The computer system of claim 54, wherein the first portlet adjusts its size such that the first portlet is substantially aligned with those other portlets having the same category attribute as the first portlet.

56. The computer system of claim 54, wherein the first portlet causes the at least one of the plurality of other portlets to adjust its size.

57. The computer system of claim 56 wherein the first portlet causes the at least one of the plurality of other portlets to adjust its size such that the first portlet is substantially aligned with the at least one of the plurality of other portlets having the same category attribute as the first portlet.

58. The computer system of claim 56, wherein the first portlet causes the at least one of the plurality of other portlets to adjust its size such that the first portlet is substantially aligned with those other portlets having the same category attribute as the first portlet.

59. The computer system of claim 54, wherein the first portlet is a newly added portlet having an initial default position on the portal page, and wherein the first portlet queries the category attribute of the plurality of other portlets immediately surrounding the initial default position of the first portlet.

60. The computer system of claim 54, wherein the first portlet is an existing portlet moved from a first position to a second position on the portal page, and wherein the first portlet queries the category attribute of the plurality of other portlets immediately surrounding the second position of the first portlet.

* * * * *